United States Patent
Nieto et al.

(10) Patent No.: US 9,783,117 B2
(45) Date of Patent: Oct. 10, 2017

(54) LUGGAGE COMPARTMENT HOOK ORGANIZER

(71) Applicant: Ford Global Technologies, LLC, Dearborn, MI (US)

(72) Inventors: Jorge Miranda Nieto, La Martinica (MX); Carlos Ernesto Saenz, Calimaya (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/633,418

(22) Filed: Feb. 27, 2015

(65) Prior Publication Data

US 2016/0250979 A1   Sep. 1, 2016

(51) Int. Cl.
*B60R 7/08* (2006.01)
*B60R 11/00* (2006.01)
*B60R 7/02* (2006.01)
*B60R 5/04* (2006.01)

(52) U.S. Cl.
CPC .................. *B60R 7/08* (2013.01); *B60R 5/04* (2013.01); *B60R 7/02* (2013.01); *B60R 11/00* (2013.01); *B60R 2011/0085* (2013.01)

(58) Field of Classification Search
CPC ........... B60R 5/044; B60R 5/045; B60R 7/02; B60R 7/08
USPC .......... 296/37.7, 182.1, 185.1; 224/282, 309, 224/324, 325, 553; 211/85.15
See application file for complete search history.

(56) References Cited

U.S. PATENT DOCUMENTS

| 3,385,547 | A | * | 5/1968 | West | B60R 7/10 211/99 |
| 4,720,028 | A | * | 1/1988 | Takemura | B60R 7/10 224/313 |
| 5,287,971 | A | | 2/1994 | Dorman | |
| 5,427,288 | A | | 6/1995 | Trubee | |
| 6,367,746 | B1 | | 4/2002 | Webb et al. | |
| 6,502,731 | B1 | | 1/2003 | Gehring et al. | |
| 6,669,067 | B2 | | 12/2003 | Schuster | |
| 6,959,954 | B2 | * | 11/2005 | Brandt | B60R 7/10 224/313 |
| 8,376,300 | B2 | * | 2/2013 | Nishida | B60R 7/08 248/292.12 |
| 2001/0050298 | A1 | * | 12/2001 | Larsen | B60R 7/04 224/311 |

FOREIGN PATENT DOCUMENTS

| DE | 202011107505 U1 * | 12/2011 | B60R 7/10 |
| FR | EP 1645471 A1 * | 4/2006 | B60R 5/04 |
| GB | 2421485 A * | 6/2006 | B60R 7/08 |

\* cited by examiner

*Primary Examiner* — Jason S Daniels
(74) *Attorney, Agent, or Firm* — Vichit Chea; Brooks Kushman P.C.

(57) ABSTRACT

A vehicle cargo system includes a support fixed to a roof of the cargo system. The support has a first edge and a second edge. The vehicle cargo system further includes a plurality of protrusions intermittently disposed laterally across the support. The plurality of protrusions is rotatable about the first edge from a vertical to a horizontal position wherein rotating the hooks about the first edge toward the roof attaches the hooks to the second edge of the support. The protrusions allow the vehicle cargo system to support objects capable of being hung.

16 Claims, 3 Drawing Sheets

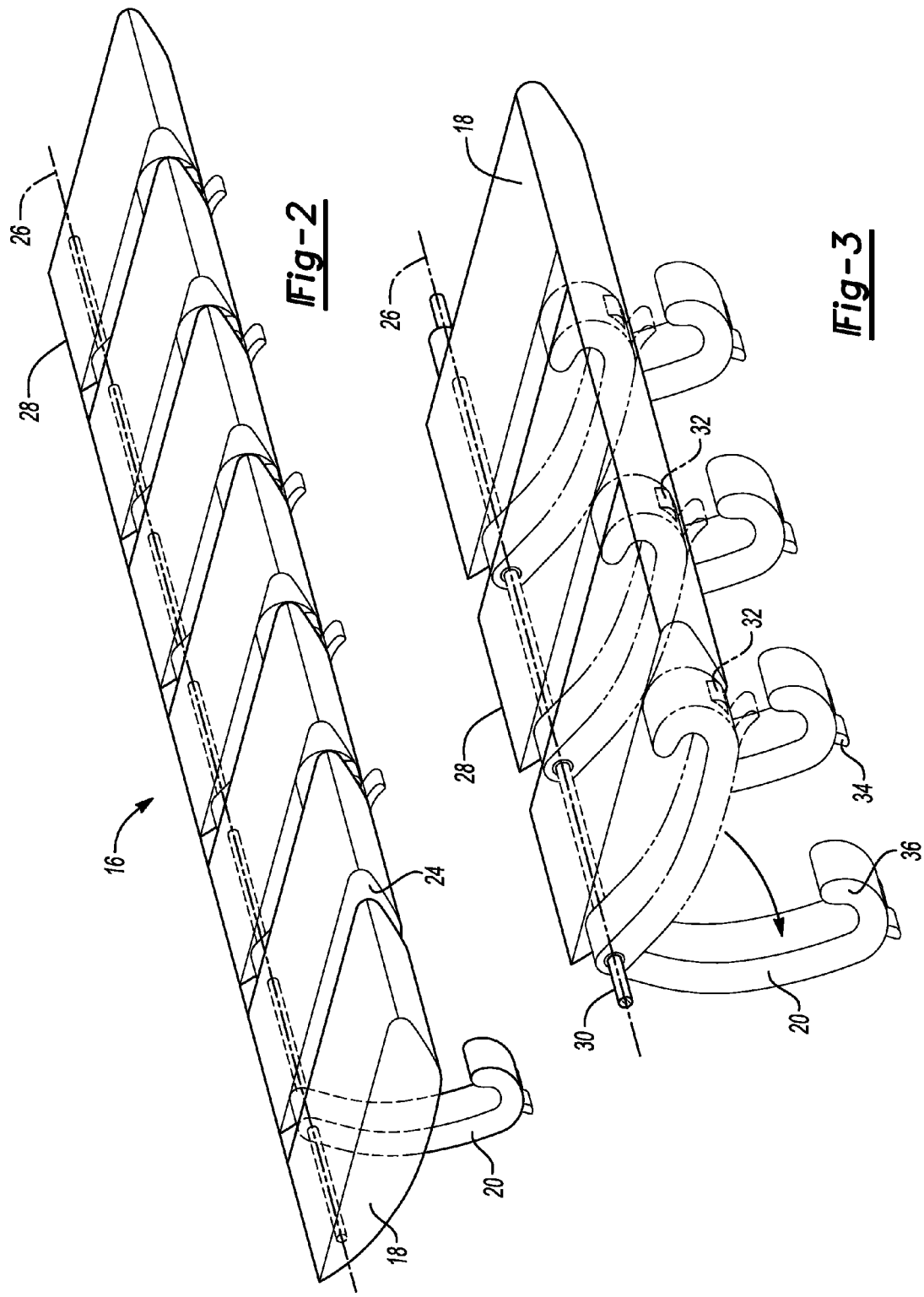

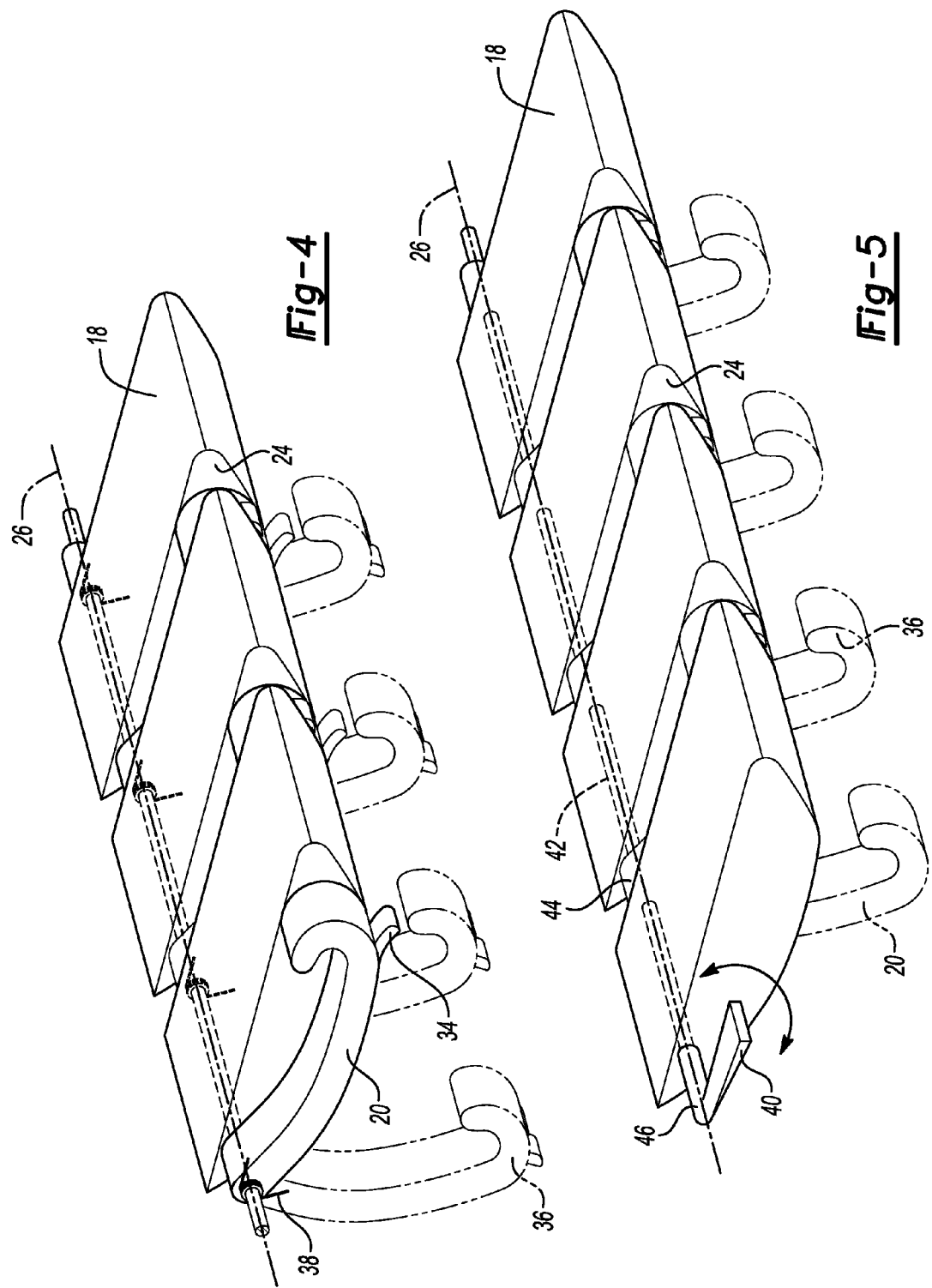

LUGGAGE COMPARTMENT HOOK ORGANIZER

TECHNICAL FIELD

The present disclosure relates to vehicle luggage compartment organizing systems.

BACKGROUND

Vehicles have cargo areas that are used by consumers to store items and transport cargo. Vehicle cargo areas may be wide-open areas that do not include an organizational system to make efficient use of the cargo area. Organizational systems may be included in vehicle cargo areas as original equipment or as an aftermarket accessory. Such systems may be removable from the vehicle or within the cargo area. And they further may define a plurality of fixed protrusions that take up space within the cargo area when not in use. Using organizational systems that take up space within the cargo area takes away from the available storage space.

These organizational systems may use a plurality of hangers to hold bags carrying items. The hangers hold the bag handles together to prevent the contents of the bags from spilling. Current organizational systems may also utilize a frame that extends between a compact position and an extended position. The frame includes one or more projections extending from the frame that are fixed relative to the frame. The fixed projections extend into the cargo area and interfere with use of the cargo area when not in use.

This disclosure is directed to solving the above problems and other problems as summarized below.

SUMMARY

A vehicle storage compartment includes a roof, a support, and at least one protrusion. The support has an upper surface, a lower surface defining a notch, and a first edge. The upper surface of the support attaches and extends across the roof. The protrusion is connected to the first edge to pivot about the first edge and engage the notch in the lower surface.

A vehicle cargo system includes a support fixed to a roof of the cargo system. The support has a first edge and a second edge. The vehicle cargo system further includes a plurality of protrusions intermittently disposed laterally across the support. The plurality of protrusions is pivotable about the first edge from a vertical to a horizontal position wherein rotating the hooks about the first edge toward the roof attaches the hooks to the second edge of the support.

A vehicle storage system includes a rear portion, a support, and a bar. The rear portion defines a compartment having a roof. The support is disposed within the compartment and is fixedly attached to the roof. The support has a protrusion extending from the support in a direction substantially perpendicular to the roof. The bar is disposed about an axis proximate a first edge of the support and extends through the support. The bar is connected to the protrusion and is configured to pivot the protrusion about the axis and attach the protrusion to the support.

BRIEF DESCRIPTION OF THE DRAWINGS

FIG. 2 is a perspective view of a cargo area organizational system having a plurality of protrusions;

FIG. 3 is a perspective view of a first embodiment of the protrusions for the storage system;

FIG. 4 is a perspective view of a second embodiment of the protrusions for the storage system; and FIG. 5 is a perspective view of a third embodiment of the protrusions for the storage system.

DETAILED DESCRIPTION

Figure 1:
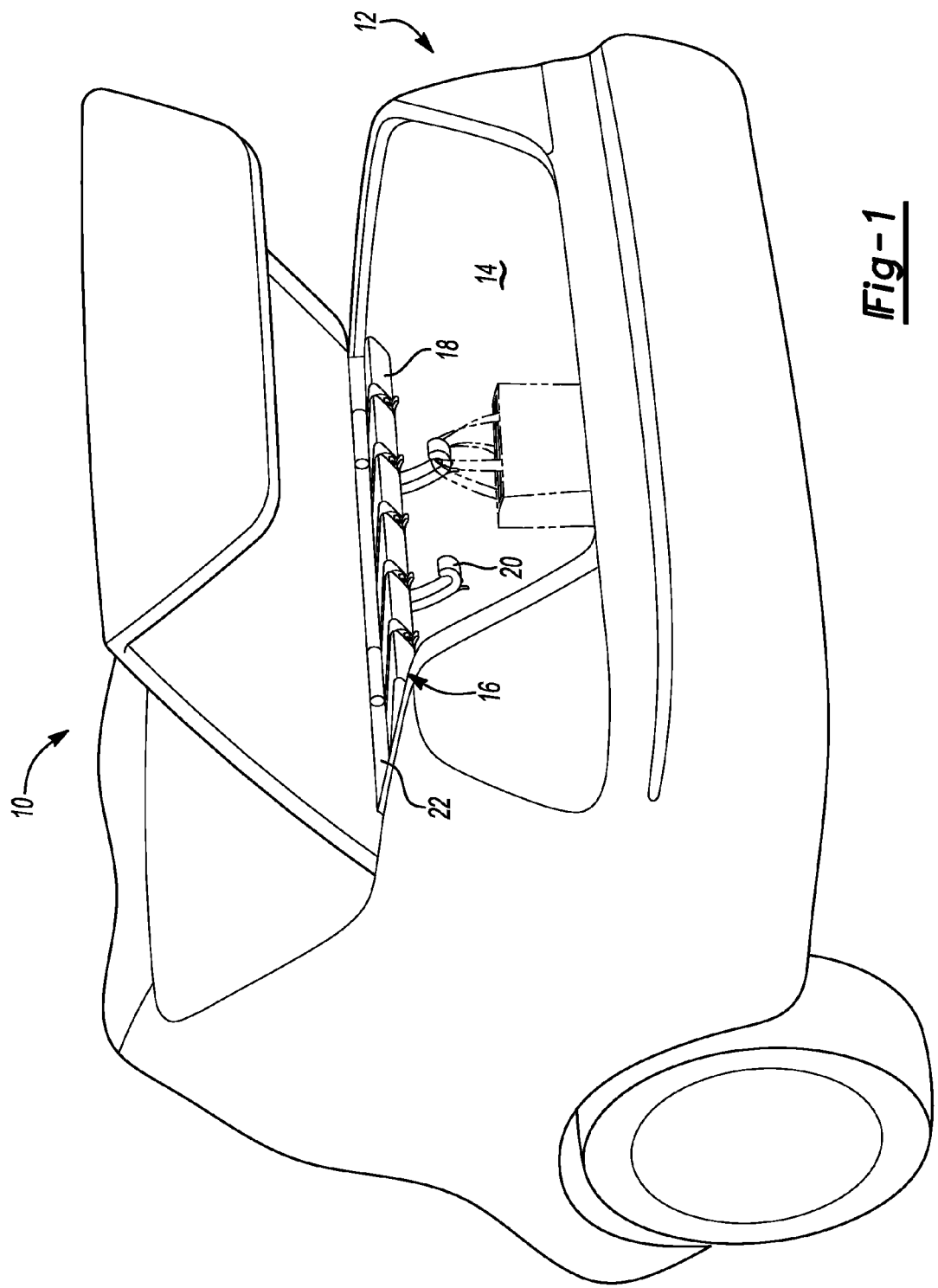
FIG. 1 is a perspective view of a vehicle having a cargo area organizational system.

Embodiments of the present disclosure are merely examples and other embodiments can take various and alternative forms. The figures are not necessarily to scale and some features are exaggerated or minimized to show details of particular components. The structural and functional details disclosed are not to be interpreted as limiting, but merely as a representative basis for teaching one skilled in the art how to practice the present invention. The various features illustrated and described with reference to any one of the figures can be combined with features illustrated in one or more other figures to produce embodiments that are not explicitly illustrated or described.

FIG. 1 depicts a schematic view of a vehicle 10. The vehicle 10 may include a rear portion 12 that defines a cargo compartment 14. The cargo compartment 14 may be equipped with an organizational system 16. The organizational system 16 includes a support member 18 and a plurality of protrusions 20. The support member 18 is fixedly attached to a roof 22 of the cargo compartment 14. The organizational system 16 is fixedly attached between the support member 18 and the roof 22 to facilitate supporting a load on the plurality of protrusions 20. In at least one other embodiment, the organizational system 16 may use a single protrusion.

The protrusions 20 extend downwardly from the support member 18. The plurality of protrusions 20 are configured to support objects capable of being hung. The protrusions 20 may define a shape such that while traveling the items hung from the protrusions 20 are not disturbed during travel. The protrusions 20 may define a J-shape or may also be a hook. The protrusions 20 are configured to support the load of a single hung object or multiple objects. The plurality of protrusions 20 may be disposed intermittently across the support member 18. The plurality of protrusions 20 may also be spaced apart at a fixed distance or may be spaced apart according to a designed configuration to optimize use of the organizational system 16.

The fixed attachment between the support member 18 and the roof 22 may be advantageous. The support member 18 uses the roof 22 to support larger loads hung from the protrusions 20. For example, supporting heavier items from the protrusions 20 increases the force acting on the support member 18. The support member 18 distributes the weight of the heavier objects across the roof 22 of the cargo compartment 14. The distribution of weight across the support member 18 and the roof 22 prevents deformation to the organizational system 16 and allows the organizational system 16 to have a wider range of uses.

FIG. 2 depicts the organizational system 16 having some of the protrusions 20 extending downwardly from the support member 18 and other protrusions 20 secured to the support member 18. The protrusions 20 are pivotally attached to the support member 18. The support member 18 defines a notch 24. The notch 24 is configured to receive the protrusions 20 to be a flush with the support member 18. The notch 24 may have a shape complementary to the protrusions 20. The flush engagement between the support member 18 and the protrusions 20 reduces the space taken up by the organizational system 16 within the cargo compartment 14. Attaching the protrusions 20 to the support member 18 allows for storage of larger items when the organizational system 16 is not in use.

The protrusions 20 pivot about an axis 26 disposed about a first edge 28 of the support member 18. The protrusions 20 pivot about the axis 26 and are locked within the notch 24 of the support member 18. The protrusions 20 may be stored on the support member 18 when not in use. Storing the protrusions 20 on the support member 18 allows organizational system 16 to be a self-storing system. The protrusions 20 may be used individually or as a grouping. For example, a single protrusion 20 may be deployed from the support member 18 while other protrusions 20 are stored and attached to the support member 18. Several protrusions 20 may be deployed at the same time and stored on the support member 18 at the same time. The protrusions 20 may be simultaneously pivoted about the axis 26 on the first edge 28 of the support member 18 or may be individually pivoted about the axis 26 proximate the first edge 28 of the support member 18.

The adaptability of the organizational system 16 allows for a wider range of objects to be stored within the cargo compartment 14. The protrusions 20 may be deployed from the support member 18 wherein the organizational system 16 uses minimal space within the cargo compartment 14. The organizational systems reduction of space allows larger or bulkier items within the cargo compartment 14. Simultaneous rotation of the protrusions 20 about the axis 26 from the support member 18 may also be advantageous. The simultaneous rotation of the protrusions 20 eases the ability to hang multiple objects from the protrusions 20. Rotation of the protrusions 20 about the axis 26 proximate the first edge 28 of support member 18 and engagement of the protrusions 20 in the notch 24 on the support member 18 are discussed in more detail with reference to the other Figures.

FIG. 3 depicts the protrusions 20 using a pin 30, a rib 32, and a tab 34 to effectuate rotation and engagement of the protrusions 20 on the support member 18. The pin 30 is disposed along the axis 26 proximate the first edge 28 of the support member 18. The rib 32 is disposed opposite the pin 30 and is configured to engage the notch 24 of the support member 18. The tab 34 is disposed adjacent the rib 32 and is configured to disengage the protrusion 20 from the notch 24 on the support member 18. Pressure is applied to the tab 34 to release the engagement between the rib 32 and the support member 18.

Rib 32 is defined on an engagement portion 36 of the protrusions 20. The notch 24 receives the engagement portion 36 when the protrusions 20 pivot. Pivoting of the protrusion 20 into the notch 24 causes engagement between the rib 32 and the support member 18. The rib 32 frictionally secures the engagement portion 36 of the protrusions 20 within the notch 24 defined on the support member 18. The rib 32 uses a shape and location to lock the protrusion 20 to the support member 18. The shape of the rib 32 is such that the protrusion 20 does not inadvertently disengage from the support member 18. And the shape of the rib 32 requires no further adaptation to the support member 18. The shape of the rib 32 may define a substantially square shape. The rib 32 may also define other shapes such as a substantially ovate shape, a substantially circular shape, or any other shape that allows the rib 32 to frictionally secure the engagement portion 36 to the support 18. The tab 34 is positioned on the engagement portion 36 proximate the rib 32. Optimizing the position of the tab 34 and the rib 32 optimizes storage and use of the protrusion 20.

FIG. 4 depicts the protrusion 20 using a biasing member 38, or spring, and the tab 34 to effectuate pivoting about the axis 26. The spring 38 biases the protrusion 20 into engagement with the support member 18. The biasing member 38 uses a spring force to pivot the protrusion 20 towards the support member 18. The tab 34 may be used to resist the spring force of the biasing member 38 and allow the protrusion 20 to extend downwardly from the support member 18. The force applied to the tab 34 opposes the force from the biasing member 38. The protrusion 20 pivots toward the support member 18 and comes to rest within the notch 24 when no force is applied to the tab 34.

The biasing member 38 allows the protrusion 20 to automatically engage the support member 18. The spring 38 biases the protrusion 20 into engagement with the support member 18. The automatic engagement between the protrusion 20 and the support member 18 allows the organizational system 16 to be a self-storing system. The protrusion 20 is in plane with the support member 18 when a load is not applied to the protrusion 20. The protrusion 20 pivots about the axis 26 and extends downwardly from the support member 18 when a load is applied to the protrusion 20 counteracting the spring force of the biasing member 38. The protrusion 20 maintains this extended position until the load is removed from the engagement portion 36 of the protrusion 20. The biasing member 38 stores the protrusion 20 within the notch 24 of the support member 18 during travel. The spring force of the biasing member 38 accounts for noise, vibration, and harshness on the organizational system 16 from various road conditions. The biasing member 38 further provides a rigid protrusion 20 when a load is applied to the engagement portion 36. The rigid protrusions 20 transmit the weight of the load through the support member 18 ensuring objects creating the load are not damaged during travel.

FIG. 5 depicts the protrusion 20 using a lever 40 and a bar 42 to allow pivoting of the protrusion 20 about the axis 26. The bar 42 extends through the support member 18 along the axis 26. The bar 42 attaches to the plurality of protrusions 20 at an attachment portion 44 disposed opposite of the engagement portion 36. Attachment between the bar 42 and the protrusions 20 allow the protrusions 20 to pivot freely about the axis 26. The lever 40 is attached to an end 46 of the bar 42. Movement of the lever 40 about the axis 26 causes the protrusions 20 to extend away from the support member 18, or to be received by the notch 24 on the support member 18.

The connection between the lever 40 and the bar 42 allows simultaneous pivoting the protrusions 20. Pivoting the lever 40 pivots the bar 42 and simultaneously pivots of all of the protrusions 20 about the axis 26. A plurality of levers 40 may also be attached to individual segments of the bar 42. The plurality of levers 40 attach to individual segments of the bar 42 when pivoting of a single protrusion 20, or pivoting of individual protrusions 20 is needed.

Pivoting the lever 40 in a downward position releases the protrusions 20. Pivoting the lever 40 and an upward position locks the protrusions 20 within the notch 24 on the support member 18. The protrusions 20 are able to support a load when the lever 40 is pivoted in a downward position. The protrusions 20 are stored within the support member 18 when the lever 40 is pivoted in upward position. The organizational system 16 provides an economical use of space by maintaining a flush engagement between the plurality of protrusions 20 and the support member 18. The support member 18 may define a substantially ovate shape. The protrusion 20 may define a complementary curvature to the shape of the support member 18. The shape of the support member and the curvature of the protrusion 20 effectuate the flush engagement of the organizational system 16. The support member 18 and the protrusion 20 may also define other shapes to effectuate a flush engagement, such as but not limited to square, or circular.

What is claimed is:

1. A vehicle storage compartment comprising:
   a support having an upper surface that attaches and extends across a roof, a lower surface defining a notch, and a first edge; and
   a protrusion, connected to the first edge, having a tab disposed at an end of the protrusion opposite of the first edge to pivot the protrusion along the first edge in a direction of pressure applied to the tab to disengage the protrusion from the notch and a rib disposed adjacent the tab to retain the end of the protrusion against a second edge of the support.

2. The vehicle storage compartment of claim 1 further comprising:
   a pin extending through the protrusion at the first edge of the support, wherein the protrusion pivots about the pin.

3. The vehicle storage compartment of claim 1 wherein the protrusion further comprises a plurality of protrusions.

4. The vehicle storage compartment of claim 3 wherein the plurality of protrusions are attached in a spaced relationship to the support.

5. A vehicle cargo system comprising:
   a support fixed to a roof and having a first edge; and
   protrusions intermittently spaced laterally across the support, pivotable about the first edge from a vertical to a horizontal position, wherein rotation to the horizontal position toward the roof, via a tab formed on an end of the protrusions opposite the first edge, attaches the protrusions against a second edge of the support using a rib adjacent the tab.

6. The cargo system of claim 5 wherein the support defines a notch at a second edge.

7. The cargo system of claim 6 wherein the protrusions have an end portion having a shape complementary to the notch in the support such that the end portion snaps into the notch.

8. The cargo system of claim 6 further comprising:
   a biasing member disposed at the first edge configured to simultaneously pivot the protrusions about the first edge toward the second edge.

9. The cargo system of claim 6 further comprising:
   a plurality of biasing members disposed along the first edge configured to individually pivot the protrusions about the first edge toward the second edge.

10. A storage system for a vehicle comprising:
    a rear portion of the vehicle defining a compartment having a roof;
    a support defining a notch disposed within the compartment fixedly attached to the roof;
    a protrusion extending from the support in a direction substantially perpendicular to the roof and including a tab disposed on an end portion of the protrusion and a rib disposed adjacent the tab to retain the end of the protrusion against a second edge of the support; and
    a bar extending through the support disposed about an axis proximate a first edge of the support and the protrusion connected to the bar such that pressure applied to the tab causes the bar to pivot about the axis in the direction of the pressure to store the protrusion within the notch.

11. The storage system of claim 10 further comprising a lever disposed on the bar, wherein rotation of the lever causes rotation of the bar to disengage the protrusion from the support.

12. The storage system of claim 11 wherein the protrusion defines a plurality of protrusions.

13. The storage system of claim 12 wherein rotation of the lever causes simultaneous rotation of the plurality of protrusions.

14. The storage system of claim 10 wherein the support defines a notch on a first surface of the support.

15. The storage system of claim 14 wherein the support defines a substantially ovate shape.

16. The storage system of claim 15 wherein the protrusions define a curvature complementary to the shape of the support wherein pivoting about the axis cause the protrusions to be received in the notch to define a substantially flush engagement with the support.

* * * * *